June 23, 1942.　　　　A. VANG　　　　2,287,543
WELDING METHOD AND APPARATUS
Filed Dec. 18, 1940
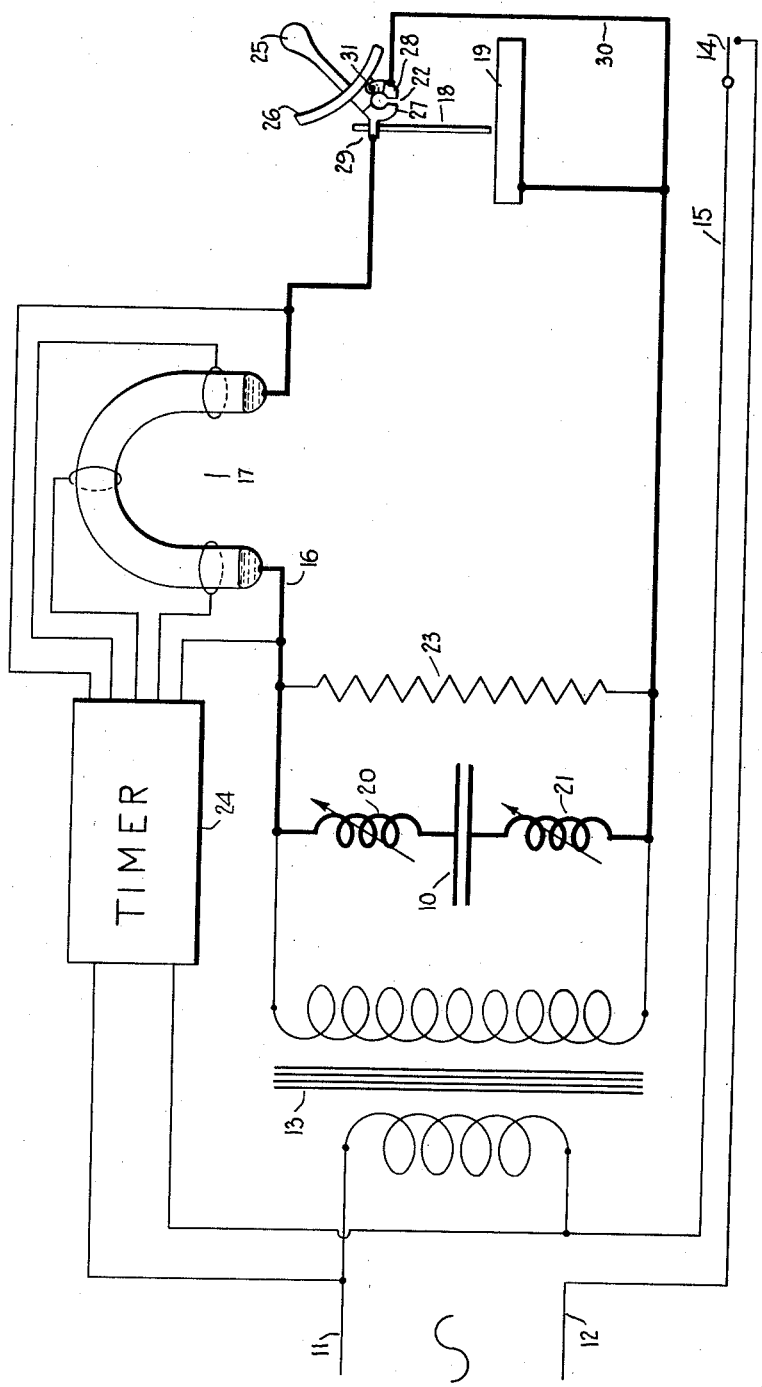
INVENTOR.
ALFRED VANG.
BY Peter M. Boesen Patented June 23, 1942

2,287,543

UNITED STATES PATENT OFFICE 2,287,543

WELDING METHOD AND APPARATUS

Alfred Vang, Detroit, Mich., assignor to Clayton Mark & Company, Evanston, Ill.

Application December 18, 1940, Serial No. 370,687

7 Claims. (Cl. 219—8)

This invention relates to electric arc welding, and more particularly to apparatus for translating electric power from commercial sources to a form adapted for use in an arc for melting metals. It also relates to means for controlling the arc, and to the method of welding employing the controlled arc.

Thus, one of the objects of my invention is to provide an apparatus which will be capable of performing a relatively great variety of melting, welding and heating operations.

An ancillary object of my invention is to provide for said operations an apparatus suitable for compact embodiments.

Another object of my invention is to provide an arc having a more sharply localized heating effect than the conventional arc.

A further object of my invention is to provide an arc which will impart a maximum of heat to the surface of the metallic article to which it is applied, while imparting a minimum of heat to the interior thereof.

An object ancillary to the last mentioned objects is to provide an arc capable of performing a greater range of welding operations than the conventional arc.

Another object of my invention is to provide an arc which shall be very stable, relative to the conventional arc.

A still further object of my invention is to provide an arc which will be easier to start than the conventional arc, or which shall be self-starting.

Yet another object of my invention is to provide a metal-heating or welding apparatus which shall be capable of controlling exactly the rate at which heat shall be supplied to the work involved.

Other objects and advantages of my invention will become apparent as the specification proceeds.

To accomplish some of the objects of my invention, I provide a capacitor for storing temporarily an increment of electrical energy, which may be derived from any convenient source, such as a commercial power line, and means for discharging said increment at high frequency into the work circuit after a predetermined time interval has passed since the last such discharge.

In this manner I can control the rate at which power is supplied to the work, for each discharge represents a measured amount of energy, and the timing of the discharges can be exactly controlled, as will be hereinafter explained.

This inherent stability of my current translating device represents a great improvement over conventional welding current supply systems, for regardless of fluctuations in the voltage of the supply line, the capacitor will transfer increments of a substantially constant size at a substantially constant rate, thus eliminating the convenional need for separate apparatus to control current consumption.

Furthermore, the high frequency characteristic of the capacitor discharge offers many advantages for welding purposes, particularly with regard to intensity and localization of the arc heat.

For example, I have found that as the frequency of an alternating current arc increases, the penetration of heat into the underlying metal takes place more slowly, while the heated zone tends to increase in area. This I attribute to the well known skin effect of high frequency alternating currents, and I believe that I am the first to make use of this effect to improve the control of heat in electric arc welding, and thus to facilitate welding operations which have heretofore been difficult or impossible. While the skin effect becomes more pronounced as the frequency increases, it is also dependent upon the nature of the materials being welded, and upon other welding conditions, and, therefore, it can not be said that there is a definite frequency at which improvements commence according to my invention, but to distinguish my process from the conventional alternating current welding, I can say that, in general, my process will require a frequency in excess of 500 cycles per second.

In the drawing, which is a schematic representation of one embodiment of my invention, the numeral 10 denotes the capacitor, 11 and 12 are commercial alternating current power lines, and 13 is a transformer for changing the power-line voltage to whatever value may be chosen for the best performance under given operating conditions. The input power may be switched on or off conveniently by a foot-operated switch, 14, connected in series with the transformer primary and line 12, through the lead 15.

The discharge circuit 16 includes a discharge tube 17, for controlling the time of discharge and hence indirectly controlling the amount of power entering the discharge circuit. The tube 17 also keeps the circuit open to permit the charging of the capacitor, then closes the circuit after the proper time interval has elapsed. The remainder of the discharge circuit includes the welding electrode 18, the work 19, and optional inductances 20 and 21.

In parallel with the discharge circuit are two optional protective devices, one of which is a spark gap 22 for protecting the transformer by taking the discharge whenever the switch 14 may be closed while the electrode 18 is too far from the work to arc before the peak voltage appears in the capacitor; and the other of which is a resistor 23 for absorbing the energy of residual charges, which otherwise would be absorbed by the transformer.

The transformer 13 is preferably of such design that it will not be damaged by a brief short-circuit of the secondary winding, such as that incidental to the closing of the high frequency circuit. Or, the transformer may be replaced by any convenient source of potential of adequate value and not too high frequency, with the general provision of an impedance in the charging circuit to protect the apparatus from unduly heavy currents.

Apparatus according to my invention will operate at virtually any voltage, so no specific value is recommended as being preferred; but the general limitations are those of insulation and safety for the operator at high voltage, and lack of power due to small condenser increments at low voltage.

The capacitor 10 may be varied in size through wide limits. It should in general be proportioned to the rest of the circuit, and should have sufficient capacity to absorb power at the selected operating voltage at about the same rate that the transformer 13 is designed to supply to it. This means that a relatively large condenser will be required if the rate of discharge is to be once for every half-cycle of commercial 60-cycle current, but a condenser of much less capacity, although not necessarily smaller size, can be employed where the discharges are more frequent.

The optional inductances 20 and 21 are high-frequency reactors for the purpose of slowing the discharge process, or partially nullifying those properties of the arc which are due to the high frequency nature of the discharge.

Thus, increasing the value of the inductances 20 and 21 will cause the heat of the arc to penetrate the work more deeply, while at the same time the arc will cover less area than before.

The inductances will not be heavy enough to play an appreciable part in the relatively slow charging process, but their disposal, as shown in the drawing, helps to minimize the leakage of high frequency current into the charging circuit, where it might cause overheating of the transformer, for the charging circuit is caused to join the discharge circuit at points where the high-frequency potential will be relatively low.

The discharge tube 17 is preferably of the type described in my copending application, Serial No. 364,701, filed Nov. 7, 1940, for High frequency discharge tube, in which its use as a switching device for high-frequency circuits is described. It is equipped with a timer 24, which is connected with the power input lines, in the case of alternating current supply, and with the adjacent parts of the high frequency circuit, so as to initiate conduction within the tube 17 at a predetermined stage of the input cycle, which would correspond to a power increment of predetermined size within the capacitor. The timer 24 could also be connected with the capacitor directly, to initiate discharge as soon as the capacitor attains a predetermined potential difference across its terminals. This latter arrangement would also be effective in the case of a direct-current power supply, as would also a timer based on elapsed time alone. A timing circuit adapted to the particular service desired, and in connection with the device described herein, may readily be devised by anyone skilled in the art.

The tube 17 may be replaced by any other device which will operate to close the high frequency circuit in synchronism with the accumuquency circuit in synchronism with the accumulation of a predetermined increment of power within the capacitor. For example, a conventional ignition-controlled cold-cathode mercury vapor "rectifier" tube may be used, as explained in my said copending application, Serial No. 364,701 or a pair of said tubes in opposed parallel connection. A spark gap or mercury arc may, also, be used, but with a great loss of efficiency.

The electrode 18 and electrode holder 25 may be of conventional type, preferably having an added shield 26 to protect the operator from accidental contact with the electrode, which will in most cases be charged with a potential in excess of that which is now conventional. For the same reason, the lead-wire 27 should be provided with heavy insulation.

The type of rod used for welding, as well as the technique to be followed, should in general correspond with conventional practice, although the control of the area and of the depth of the penetration of heat afforded by my invention should lend itself to the development of new techniques, especially for welding thin sheets, or for difficult metals, or for joining metals of widely different properties; for with my invention I can apply a more intense heat to the surface of the metal while causing less disturbance in the metal beneath the surface than does the conventional arc.

The spark-gap 22, as mentioned before, is an optional protective device to prevent overheating of the transformer; thus, if it were not present, and the switch 14 should be closed when the electrode 18 is more than arcing distance away from the work, no discharge of the capacitor would take place, but instead an increased increment of energy would flow back and forth through the transformer, causing excessive heat to be generated therein. If, however, the gap is connected as shown, and if the electrodes thereof are spaced a distance close enough to cause an arc when the capacitor is charged to maximum potential difference, but not close enough to cause an arc at normal working potential of the capacitor; then the energy, which was just described as heating the transformer, will be discharged in the spark gap instead.

This spark can be put to other use in addition to protecting the transformer. By rigging the gap on the working side of the shield 26 of the electrode holder, it can be used as a source of light to illuminate the work whenever the welding arc may be broken, or before the welding arc is started. The illumination from the spark gap is of approximately the same intensity as that from the arc, therefore, the operator will be able to see the work through protective glasses by light from the spark gas before the working arc is started. Thus, by closing the line switch 14 before starting a weld, the spark gap is brought into operation, illuminating the work. The operator has then ample time to bring the electrode into exact position for starting the working arc. When the electrode has been placed within arc starting distance of the work, the welding arc can be started by a brief opening of the line switch.

In the embodiment shown, the spark electrode 27 forms a part of the welding electrode clamp 29, while the spark electrode 28 is insulated therefrom and grounded by the lead 30 and work 19. The spacing between the spark electrodes 27 and 28 is adjustable by means of the clamp screw 31.

Furthermore, any time the arc may be broken accidentally, the work will be instantly illuminated by light from the gap.

The optional resistor 23 has been placed in parallel with the discharge circuit as a further protection for the transformer 13. There will always be a residual charge in the capacitor at the end of each discharge train when the tube 17 becomes non-conducting. This residual charge will tend to discharge itself through the transformer, causing heat in the latter after a number of oscillations. The purpose of the resistor 23 is to damp such oscillations and thus to absorb the heat which would otherwise appear in the transformer and also in the capacitor. Its value should be a compromise, as it also takes energy from the working oscillations, although not at the peak voltage thereof, because of the gradient through the high frequency reactors 20 and 21.

It is obvious that changes may be made in the form, construction and arrangement of the parts, as shown, within the scope of the appended claims, without departing from the spirit of the invention, and I do not, therefore, wish to limit myself to the exact construction and arrangement shown and described herein.

What I claim as new, and desire to secure by Letters Patent of the United States, is:

1. An electric arc welding device including a capacitor, means for charging said capacitor repeatedly to a fixed voltage, an arc welding circuit, and bi-directional electronic discharge means for discharging said capacitor into said arc welding circuit after every charging thereof.

2. An electric arc welding apparatus, comprising serially connected welding electrodes, capacitor and bi-directional electronic discharge device; means for charging the capacitor; and timing means for controlling said discharge device.

3. The method of electric arc welding which comprises discharging a capacitor through welding electrodes in timed relation to the charging thereof, by means of a bi-directional electronic discharge device.

4. An electric arc welding apparatus, comprising serially connected welding electrodes, capacitor and bi-directional electronic discharge device; means for charging said capacitor; and timing means connected to said discharge device for controlling said discharge device.

5. An electric arc welding apparatus, comprising serially connected welding electrodes, capacitor and bi-directional electronic discharge tube; means for charging said capacitor; and timing means electrically connected to said discharge tube for controlling said discharge tube.

6. An electric arc welding apparatus, comprising serially connected welding electrodes, capacitor and bi-directional mercury vapor discharge tube, means for charging said capacitor; and timing means connected to said discharge tube for controlling said discharge tube.

7. An electric arc welding apparatus, comprising serially connected welding electrodes, capacitor and bi-directional mercury vapor discharge tube, and means for charging said capacitor, said discharge tube operating to release the charge from said capacitor to said electrodes.

ALFRED VANG.